US009510209B2

(12) United States Patent
Randall et al.

(10) Patent No.: US 9,510,209 B2
(45) Date of Patent: Nov. 29, 2016

(54) TECHNIQUES FOR PROVIDING A SMALL CELL DEPLOYMENT PLAN

(71) Applicant: Viavi Solutions UK Limited, Berkshire (GB)

(72) Inventors: Pete Randall, Faringdon (GB); Krassimir Stoyanov Vassilev, Hermitage (GB); Peter Kenington, Chepstow (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 14/663,387

(22) Filed: Mar. 19, 2015

(65) Prior Publication Data

US 2016/0157106 A1    Jun. 2, 2016

Related U.S. Application Data

(60) Provisional application No. 62/085,801, filed on Dec. 1, 2014.

(51) Int. Cl.
*H04W 40/00* (2009.01)
*H04W 16/22* (2009.01)
(Continued)

(52) U.S. Cl.
CPC .......... *H04W 16/225* (2013.01); *H04W 16/18* (2013.01); *H04W 16/32* (2013.01); *H04W 24/02* (2013.01)

(58) Field of Classification Search
CPC .................................. H04W 16/225
USPC .......................................... 455/446
See application file for complete search history.

(56) References Cited

U.S. PATENT DOCUMENTS

| 8,374,596 B2 | 2/2013 | Thiel et al. |
| 2008/0070580 A1* | 3/2008 | Menich ................. H04W 24/02 455/446 |

(Continued)

FOREIGN PATENT DOCUMENTS

| EP | 2 506 623 A2 | 10/2012 |
| EP | 2 693 796 A1 | 2/2014 |

OTHER PUBLICATIONS

Extended European Search Report corresponding to EP Application No. 15 19 6755, mailed Mar. 2, 2016, 10 pages.

*Primary Examiner* — Santiago Garcia
(74) *Attorney, Agent, or Firm* — Harrity & Harrity, LLP (57) ABSTRACT

Techniques for providing a small cell deployment plan are disclosed. In one particular exemplary embodiment, the techniques may be realized as a system for providing a small cell deployment plan. The system may comprise one or more processors communicatively coupled to a mobile communications network. The one or more processors may be configured to determine a time period in which network congestion is experienced within a mobile communications network. The one or more processors may also be configured to receive measurement data from mobile communications devices of users within the mobile communications network at or around the time period. The one or more processors may further be configured to assess performance of the mobile communications network based upon the measurement data. The one or more processors may also be configured to perform simulation analysis to determine impact of placing an additional base station at one or more locations with the mobile communications network. The one or more processors may additionally be configured to provide a recommendation for deployment of one or more base stations based on the simulation analysis.

21 Claims, 4 Drawing Sheets

(51) Int. Cl.
*H04W 16/18* (2009.01)
*H04W 16/32* (2009.01)
*H04W 24/02* (2009.01)

(56) References Cited

U.S. PATENT DOCUMENTS

| | | | |
|---|---|---|---|
| 2010/0144334 A1* | 6/2010 | Gorokhov | H04L 5/0035 455/418 |
| 2011/0294499 A1 | 12/2011 | Vikberg et al. | |
| 2011/0319093 A1 | 12/2011 | Flanagan | |
| 2012/0170466 A1* | 7/2012 | Lee | H04W 24/02 370/252 |
| 2012/0225628 A1* | 9/2012 | Ho | G06N 3/126 455/115.1 |
| 2013/0107828 A1* | 5/2013 | Dinan | H04W 72/0446 370/329 |
| 2013/0210449 A1 | 8/2013 | Flanagan | |
| 2013/0210450 A1 | 8/2013 | Kenington et al. | |
| 2013/0227659 A1* | 8/2013 | Raleigh | G06Q 10/06375 726/5 |
| 2013/0231084 A1* | 9/2013 | Raleigh | G06Q 10/06375 455/408 |
| 2014/0098671 A1* | 4/2014 | Raleigh | H04M 15/80 370/235 |
| 2014/0171102 A1 | 6/2014 | Murphy et al. | |
| 2014/0171103 A1 | 6/2014 | Murphy et al. | |
| 2015/0092627 A1* | 4/2015 | Liu | H04B 7/2656 370/280 |
| 2015/0189479 A1 | 7/2015 | Kenington et al. | |
| 2015/0280888 A1* | 10/2015 | Karsi | H04L 5/0073 370/329 |

* cited by examiner

TECHNIQUES FOR PROVIDING A SMALL CELL DEPLOYMENT PLAN

CROSS-REFERENCE TO RELATED APPLICATIONS

This application claims priority to U.S. Provisional Application No. 62/085,801, entitled "Techniques for Providing a Small Cell Deployment Plan," filed Dec. 1, 2014, which is herein incorporated by reference in its entirety.

TECHNICAL FIELD

The present disclosure relates to a wireless telecommunications system, and more particularly, to techniques for providing a small cell deployment plan.

BACKGROUND

Mobile communication devices, such as smart phones, tablets, and other electronic hand-held devices, are becoming increasingly popular. In order to support the growing number of mobile communications devices, wireless communications systems employ radio network subsystems with macro cells using one or more high-powered base stations. Although advances in technology have made it possible for these base stations to cover relatively large geographical areas, there may still exist regions within these covered areas that need additional network capacity. For example, a hotspot with a large population of people using their mobile devices may cause a disproportionate amount of network usage. Small cells have been traditionally used to add coverage to a network in such areas. However, small cell deployment is typically unscientific and costly. Current small cell deployment schemes fail to utilize detailed knowledge of individual users, their devices, habits, trends, and other specific information of real users to provide a reliable and efficient plan for deploying small cells. In view of the foregoing, it may be understood that there may be significant problems and shortcomings associated with current solutions and technologies for small cell deployment.

SUMMARY OF EMBODIMENTS

Deploying small cells may increase capacity of a network, especially where hotspots of activity are located (e.g. at, or immediately outside, a busy train station). For example, such areas may use a disproportionate amount of a macro base-station's resources, despite representing a fraction of its geographical coverage area.

Small cells may also add coverage to a network to areas where signals are hard to reach. For example, network signals may have difficulty propagating to areas that it should cover due to the local topography (e.g., the presence of tall buildings).

Deploying small cells, however, may not be cost-effective. For example, deploying small cells in a network may require installation of some form of backhaul, which may at times be involved and complicated. Moreover, deploying a small cell may offer other challenges. For example, if a small cell is to be deployed at street level, an installer may need permits so that a small cell may be mounted at street level (e.g., on a lamp post). Such permission may involve payment of a site rental fee and may involve the replacement/upgrading of the lamp post in some manner. Thus, small cell deployment may involve planning/installing at locations where it balances and maximizes network and financial benefits.

Traditional methods for deploying small cells have been largely empirical, relying upon the expertise of network planners and the targeting of locations where it is 'obvious' large numbers of users gather. Traditional approaches are generally unscientific and often do not truly know whether a particular deployment location will resolve a network capacity issue, for example, until deployment has been made. By then, it may be too late and mistakes and costs will have been incurred for an upgraded small cell system that may not adequately resolve the intended issues. Furthermore, for network operators or installers to concentrate only on the most obvious deployment locations may leave many potential sites, which have a good business case for deployment, undiscovered and underserved.

By utilizing real user experience data as a part of a forensic analysis of all areas of a network region, small cells may be deployed in an efficient and cost-effective manner that also greatly benefits the network. Based upon a predicted coverage footprint of a small cell, using various specific pieces of information about or from users located in that area of the network and their network experience within that area of the network, a large number (if not all) possible small cell locations across a defined geographical area (e.g., a city) may be evaluated systematically. Resulting data may form the basis for, and provide a list of, many (or all) locations for small cell deployment that make the most financial and network-friendly sense, in addition to other possibilities that may have been unconsidered using traditional models.

As discussed above, small cell deployment may involve determining as many locations as possible within a geographical location (e.g., a city) that would make the most sense from a commercial and network standpoint and, in some embodiments, ranking those locations in order of financial or other benefit to the network operator and/or the network users. In order to do this, there may be several factors to consider. For example, these may include traffic density, user mobility, uniqueness of users, status of users, radio resource control (RRC) connection set-up success rate, dropped calls, blocked calls, cost of deployment, and/or other relevant factors.

With regard to traffic density, the higher the density, the more likely a small cell deployment will make sense, in terms of alleviating congestion on an umbrella macro cell or base station.

In terms of user mobility, it should be appreciated that if most users, at a given location, are moving quickly (e.g., in cars on free-flowing roads), then even though traffic density may be high, it may not make sense to deploy a small cell at that high-density locale since users only spend a small amount of time within that coverage footprint. If a small cell were to be deployed there, network overhead involved in handing the user over to the small cell and then handing them back (soon afterwards) to a macro network would be highly inefficient.

Furthermore, it may be possible that decay in signal strength suffered by a user when (rapidly) leaving the coverage footprint of the small cell could be so severe or quick that a call or network session may be dropped before handover back to the macro network would complete. This may result in a dropped call/session, which may mean that the addition of a small cell at that location could actually make network performance worse, rather than better.

In some embodiments, user mobility may be measured against a threshold. For example, an average user mobility of greater than a given threshold (say 7 m/s) may indicate that a particular location may be a poor choice for installing a small cell (e.g., despite traffic density data/figures suggesting that it could be), due to the limited time for which the small cell could serve such users, as just discussed.

With regard to unique users, a large number of unique users, for example, present at a given location may provide an indication that a large number of customers may be being impacted by a restriction in capacity at that location. Inconveniencing a large number of customers in this way (by providing a poor service) may likely lead to a significant churn from those customers, to another operator. Such churn may be very costly for an operator, since each customer is relatively expensive to acquire (e.g., from handset subsidies, introductory discounts, etc.).

By contrast, a small number of heavy data users (and in particular, low-spending, unlimited data users), who cause congestion at a particular location, may not warrant the deployment of a small cell. If such (unprofitable) users churn to a different network, then this may be beneficial from the vantage point of the original operator.

It may also be possible that congestion from a small number of heavy data users could be a statistical anomaly, rather than an on-going problem. For example, it may be that the one or two heavy data users are only at that location as a one-off or on an occasional basis. Neither of these circumstances may warrant installation of a small cell at that location. The chances of this being the case when considering a very large number of users at a given location, is much lower.

User status may be a factor to consider as well. For example, a user may be designated as having VIP status. Installing a small cell at a location (e.g., a financial district of a city) that is frequented by VIPs or big-spending users, may be beneficial. Such users may be assigned a higher weighting (per user) than lower-spending users, effectively making the threshold for the number of unique users lower in that area, when determining whether to deploy a small cell.

Radio resource control (RRC) connection set-up success rate may be a measure of how many attempted calls (e.g., a user placing a call on his/her phone) or data sessions are successfully set-up by the network (e.g., for which the network has sufficient radio and other resources available at the required time in order to set up the call or data session). A large failure rate, for example, at a given point in the day, may be an indicator of a congested network at that location, at that time of day. Other signaling procedures may also be considered and evaluated—either as success rates, or as overall rates, depending on circumstances and objectives.

Dropped calls may be another important factor to consider. For example, a measure of the number of connected calls/sessions that are dropped (terminate abnormally) may be a result of insufficient capacity being available in a cell to which handover is being attempted. This may be an indication that additional capacity is needed in that (geographical) area of the network. Again, this metric may indicate a problem at a particular time of day (as opposed to throughout the day—few sites will suffer problems of this nature for the whole of the day).

Blocked calls may be similar to the connection setup success rate, but slightly more fundamental. Blocked calls/sessions may be a measure of the number of attempted calls/sessions where a user fails even to be able to begin the process of placing a call, due to a complete lack of network capacity/availability (e.g., all carriers or carriers/time-slots, etc. being fully utilized by other users).

With regard to cost of deployment, this metric may recognize that cost of deploying a small cell will vary depending upon the precise location chosen. For example, locations where power and backhaul are easily available (perhaps at the side of a street or on the wall of a building) may be more cost-effective as locations to deploy a small cell than in a middle of a busy street. As a result, even though a purely user-experience based key performance indicator (KPI) scoring may indicate that the middle of the busy street would be the optimum location at which to place a small cell—from a network coverage or capacity standpoint—considering financially-based metrics may result in placing the small cell at a street-side location that is much more cost-effective and without much negative impact upon the desired additional coverage or capacity compared to the original target location.

It should be appreciated that a limited overall budget may be available from the network operator, at a given point in time, as well. For example, if budget is available for the deployment of 20 small cells within a given city, techniques described herein may return the 20 best candidate sites for deployment (e.g., the 20 sites offering largest improvement in one or a combination of the above metrics, even though 30 or more sites might meet the operator's small cell deployment criteria, defined as one or more of their metrics exceeding the minimum threshold at which a deployment would be considered to be sufficiently advantageous).

It should be appreciated that in such a scenario, an operator may weigh a combination of some or all of the above metrics (plus, potentially, other additional metrics), to form an overall KPI score. The precise metrics to be used, and their relative weights, may vary from operator to operator and perhaps also from location to location. If this weighted KPI score, calculated for a given location within the network, exceeds an operator-determined minimum threshold, then a small cell deployment may make sense at that particular location.

There may be many other metrics that could be used. It should be appreciated that all or some of the metrics may be applied to evaluate at various points across a network. For example, in some embodiments a combination of these metrics may be used to evaluate at a 10 m resolution across a network area (e.g., city) in order to determine all locations at which deploying a small cell would make financial/economic sense (given budgetary constraints, as discussed above).

Figure 1:
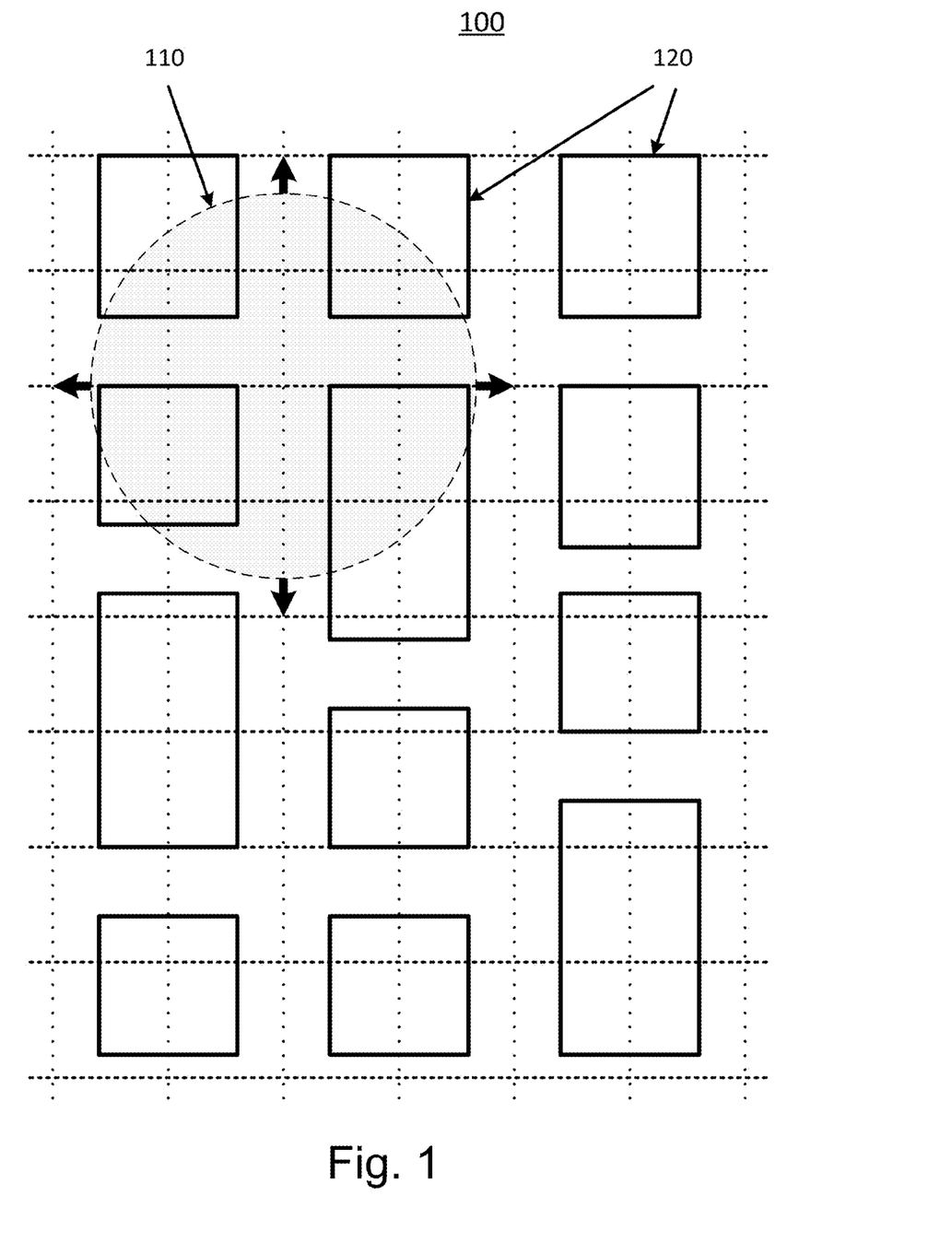
FIG. 1 depicts a coverage area for planning small cell deployment, according to an exemplary embodiment.

FIG. 1 depicts a small cell coverage area for small cell deployment, according to an exemplary embodiment. For example, FIG. 1 may illustrate a map (aerial) view 100 of a city, with a superimposed grid and a notional coverage pattern for a small cell 110 (with the small cell antenna assumed to have an omni-directional pattern and assumed to be located at the centre of the circular coverage). Alternatively a specific coverage pattern shape and/or antenna pattern may be used as well. The small cell coverage 110 shown may be placed at any point within various structures 120 (e.g., buildings in a city), with relatively few exceptions (e.g., the center of the street, although even this location could be accommodated by means of a suspension cable, strung between buildings on opposite sides of the street). It may be important to analyze as many locations as possible (whether on the illustrated grid or not) for potential small cell placement locations. This is illustrated by the arrows attached to the coverage area, which may show that a coverage pattern may be moved in any direction (yet still retaining its circular shape) or multiple directions, simultaneously. In other words, this may be akin to moving a lens or magnifying glass across a map, with measurements taken at each location magnified, to build up contours for the various parameters/metrics discussed above.

For example, as the coverage pattern 110 is moved from being centered on a building 120 to across a street to an adjacent building, a user mobility metric/parameter contour may go from a low value, when the coverage is centered on the first building, through a maximum, when the coverage is centered on the street (with its fast moving traffic) back to a lower value, as coverage is centered on the second building, across the street from the first. Similar contours may be constructed for the other parameters (at the same time/location), utilizing real user experience (RF and QoS) measurements taken from users in the locations passed (based upon their actual experiences from the macro network and simulated (improved) experience, should a small cell be placed at the point being analyzed).

The data used in order to assess, for example, the number of dropped calls experienced by users of each macro cell within the area of interest, or any other parameters or metrics which may be derived directly from the users' terminal equipment or network data, may be analyzed in order to determine the above-mentioned metrics, which combine, in some cases, to form the overall, operator-determined, KPI score. Use of real-user experience data may provide a much more accurate answer, when considering small cell deployment locations, since this data may eliminate inaccuracies inherent in generic propagation models and drive-testing studies (which may be necessarily limited in scope, for cost reasons). It may also place the users where they actually make use of the network, on a day to day basis, and not at assumed locations as determined by a propagation/network planning tool. Such assumed locations may well be random placements or algorithmically determined placements and hence not as representative of real user behavior as the real-user location data and statistics.

Figure 2:
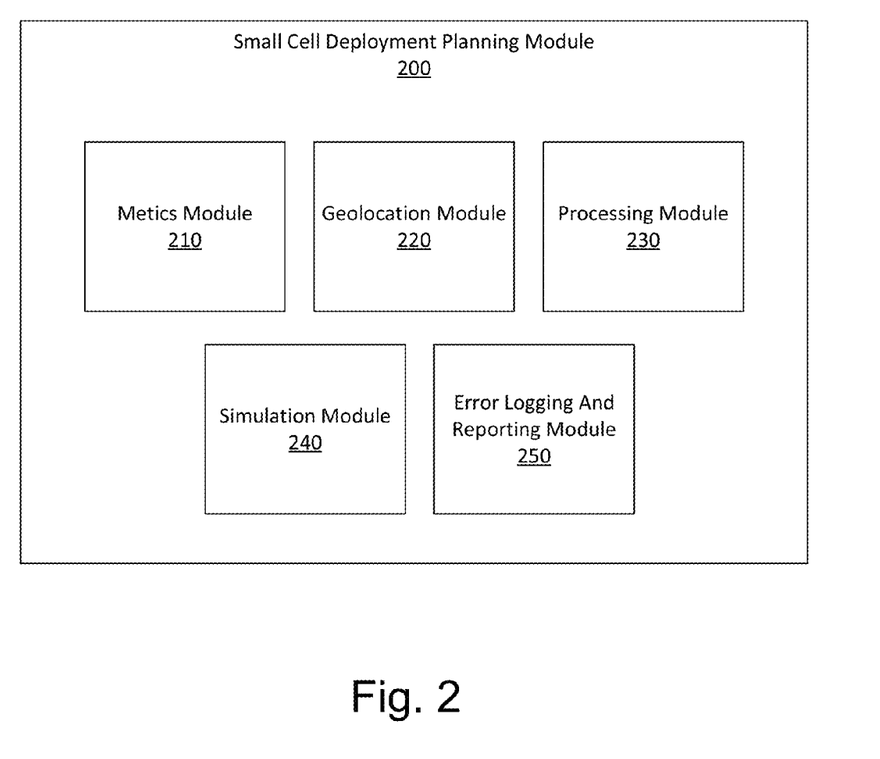
FIG. 2 depicts a small cell deployment planning module, according to an exemplary embodiment.

FIG. 2 depicts a small cell deployment planning module 200, according to an exemplary embodiment. Referring to FIG. 2, there is shown a small cell deployment planning module 200 in accordance with an embodiment of the present disclosure. As illustrated, the small cell deployment planning module may contain one or more components including: metrics module 210, processing module 220, geolocation module 230, simulation module 240, and error logging and reporting module 250.

The description below describes network elements, computers, and/or components of a system and method for planning small cell deployment. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of, or in addition to, the function performed at the particular module. Further, the modules may be implemented across multiple devices and/or other components local or remote to one another. Additionally, the modules may be moved from one device and added to another device, and/or may be included in both devices.

Metrics module 210 may be used to collect, use, and determine network congestion/capacity based on one or more of the metrics described herein, or other relevant metrics/parameters. It should be appreciated that these metrics/parameters/measurements may be stored as well over a period of time and may be associated with user, network, and/or business/financial data or trends.

Geolocation module 220 may be used to determine geolocation or geolocation-derived data associated with a mobile device. For example, as discussed herein, the geolocation module 220 may be used to receive information from a mobile device associated with geolocation or the determining of the geographic location of that mobile device, such as: GPS-derived timing and/or location information, signal strength data, round-trip signal (propagation) timing for signals from the base-station to the mobile device and/or from the mobile device to the base-station, direction-of-arrival of signals to/from the mobile device, speed of movement of the mobile device, direction of movement, etc., and may also use that information to calculate and determine where the mobile device is traveling to so that this information could be further processed to provide an approximate location of one or more mobile devices within the estimated coverage area. Furthermore, this information may be used in in conjunction with satellite-based navigational measurements, such as GPS (Global Positioning System), GLONASS (Global Navigation Satellite System), Galileo (European-based satellite navigation), or other similar data.

It should be appreciated that the geolocation module 220 may perform one or more geolocation techniques in accordance with at least the following: U.S. Patent Publication No. 2011/0319093 to Flanagan, entitled "Geo-location in a Wireless Communication Network," filed on Sep. 19, 2011 and published on Dec. 29, 2011; U.S. Pat. No. 8,374,596 to Thiel et al., entitled "Method and Apparatus for Deriving Pathloss Estimation Values," filed on Dec. 21, 2009 and issued on February 2013; U.S. Patent Publication No. 2013/0210450 to Kenington et al., entitled "Method and Apparatus for Geolocating Wireless Communication Unit," filed on Feb. 9, 2012 and published on Aug. 1, 2013; U.S. Patent Publication No. 2013/0210449 to Flanagan, entitled "Mobile Geolocation," filed on Sep. 19, 2011 Feb. 9, 2012 and published on Aug. 1, 2013; U.S. Patent Publication No. 2014/0171102 to Murphy et al., entitled "Mobile Geolocation," filed on Dec. 18, 2012 and published on Jun. 19, 2014; and U.S. Patent Publication No. 2014/0171103 to Murphy et al., entitled "Method and System for Mobile Reference Signature Generation," filed on Dec. 18, 2012 and published on Jun. 19, 2014, all of which are herein incorporated by reference in their entireties.

Processing module 230 may be used to analyze the various metrics for the network and users to determine potential small cell deployment locations. In some embodiments, KPI scores may be generated and such results may be used to plan small cell deployment. The processing module 230 may also consider and process business/financial parameters and likely zoning or planning restrictions.

Simulation module 240 may be used to analyze the impact of adding a small cell in a network at one or more proposed locations. Simulation module 240 may be used to predict the impact upon a network and/or a plurality of users in the network. Simulation module 240 may also incorporate KPI scores as part of its simulation analysis.

Error logging and reporting module 250 may produce logs, reports, or other information associated with estimating a coverage area for planning small cell deployment. It should be appreciated that any or all of these modules may be communicatively coupled to one or more databases or storage/memory units (not shown), locally or remotely, so that information may be stored for later use or processing.

Figure 3:
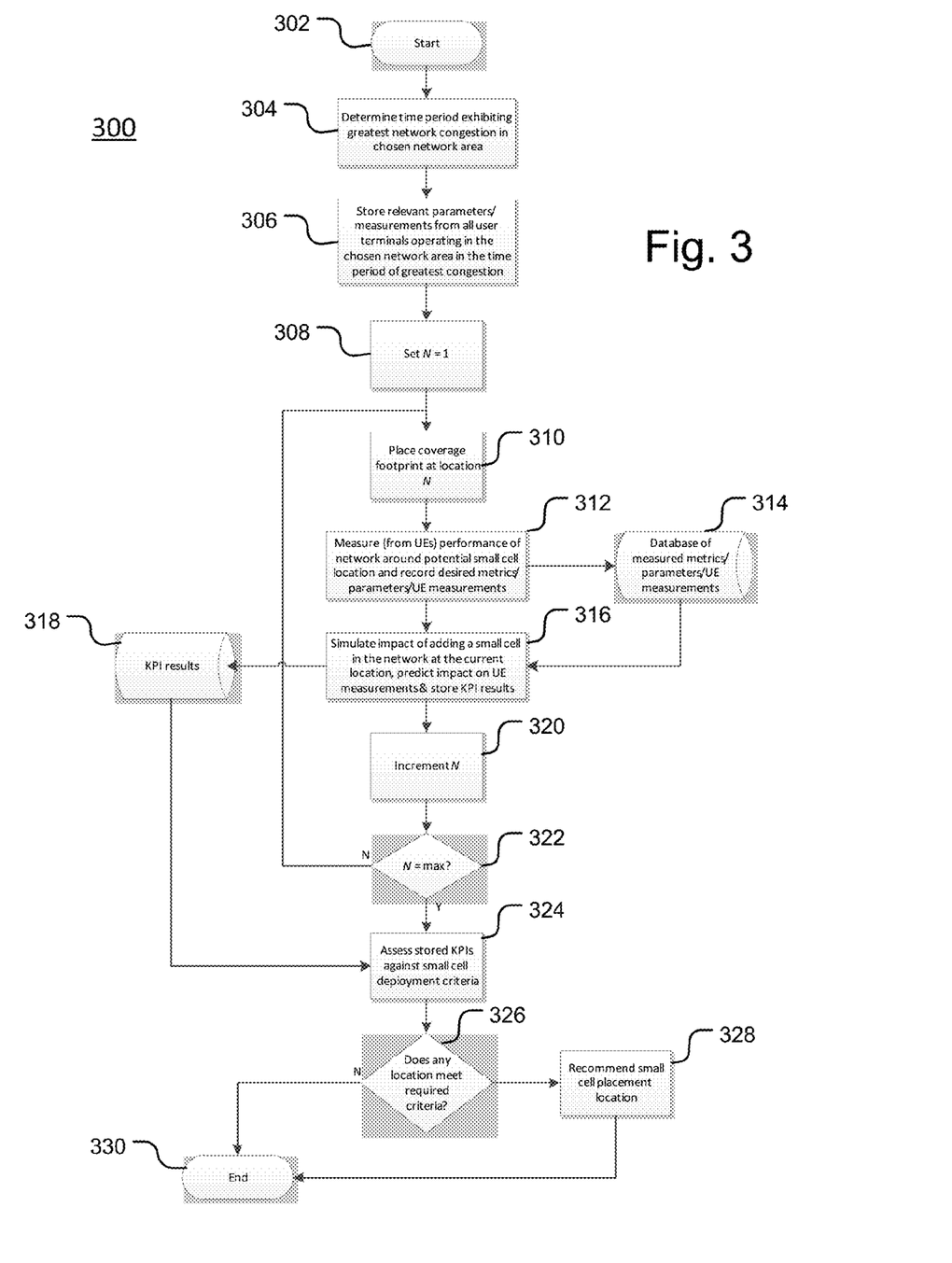
FIG. 3 depicts a flowchart of a method for planning small cell deployment, according to an exemplary embodiment.

FIG. 3 depicts a flowchart of a method 300 for small cell deployment, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by at least the systems, configurations, diagrams, schematics, and modules in FIGS. 1-2, by way of example, and various elements of module 200 are referenced in explaining the exemplary method of FIG. 3. Each block shown in FIG. 3 represents one or more processes, methods, or subroutines carried out in the exemplary method 300. A non-transitory computer-readable medium comprising code, which when performed by a computer may perform the acts of the method 300 may also be provided. Referring to FIG. 3, the exemplary method 300 may begin at block 302.

At block 304, the method may begin by evaluating all time periods throughout a day, week, or other relevant period of time, over a particular (chosen) portion of a network.

At block 306, this information may be stored or used to determine in which time period there exists the greatest network congestion for each network site.

Real-user data, measured by the users' terminal equipment, for this time period may then be received or extracted from a database of all user quality of service (QoS) and radio measurements and used for the following assessment of the benefits of installing a small cell at various possible locations within that area of the network.

In some embodiments, the method may set a counter as well. For example, as shown in FIG. 3, this counter may be one-dimensional, representing the case where all possible locations are enumerated 1 . . . N, with there being a maximum of N possible locations to assess. In some embodiments, more than one counter may be used. For example, two counters may be used—with one representing latitude (in some fashion) and the other representing longitude (in some fashion). In this scenario, the method may run until all possible combinations of both counters had been attempted.

It should be appreciated that unique metrics/parameters, such as building height, may be taken in to account as well. For example, a 3D search may be conducted of possible small cell locations. In this scenario, the counter, N, may be replaced by 3 counters, with one representing latitude (in some fashion) another representing longitude (in some fashion) and a third representing height.

Note that it may be advantageous to assess all credible locations, with this subset omitting known locations that are unlikely to be possible to place a public access small-cell (for example within a privately-owned building) or locations where new/additional power or backhaul services may be required (which would be difficult or costly to provide).

Referring back to FIG. 3, in some embodiments, at blocks 308, 310, and 312, location N (where N=1 in the first instance) may be assessed for each metric of interest, prior to the simulated placement of a small cell and the results stored in a database or other suitable storage location. This may provide a baseline of real user measurement data, from substantially all users active in that area of the network at the chosen (congested) time. Any (simulated) improvements resulting from the placement of a small cell at location N may be judged against this baseline. In some embodiments, the measurement data may be stored in one or more data storage for further analysis (block 314).

In some embodiments, the (simulated) impact of adding a small cell, on the real-user data/measurements may then be undertaken. For example, at block 316, simulation may change/update these real-user measurements, based upon the simulated placement of a small cell at location N. For instance, a simulation of users who would have handed over to a small cell, based upon their location, signal strength, or other parameter, were such a small cell present at location N, may be provided. In the simulation, these users may be handed over and the impact on the macro network assessed (with the users now assumed to be served by the small cell removed, thereby freeing resources for the remaining macro-cell users, whose metrics will also be assessed on the assumption that they now have more network resources available to them). The result of both of these assessments, on the (now) small cell users and also on the remaining macro-cell users, may be stored in at least one database or other suitable storage mechanism.

It should be appreciated that such simulation analysis may extend to simulating the likely coverage footprint of the small cell, in the location (N) chosen for study, rather than, for example, simply assuming a circular coverage footprint with a 200 m radius, say, (for outdoors) or a 50 m footprint, say, (for indoors).

In some embodiments, at block 320, the counter N may then be incremented and a check may be carried out to assess if the complete set of possible placement locations has been assessed (e.g., if N=max, where max=the number of locations to be assessed+1) (block 322).

If this maximum has not been reached, then the method may continue. If not, the method may, in some embodiments, loop back and assess the next location, and so on, until all locations have been assessed/analyzed.

In some embodiments, once all (or a defined set of) locations have been assessed, KPI/metrics data may be stored (block 318), analyzed, and/or tested to ascertain if any of these assessed locations meets the required criteria for the installation of a small cell (block 324). If one or more locations meet the required criteria (block 326), then at block 328, the method may output one or more recommended locations before the method terminates. If not, the method may terminate without generating a recommendation.

The method, in essence, may assume that a small cell is (virtually) placed at a given assessment point, its impact on the traffic at that location is assessed, and then the small cell is removed and (in a further iteration of the algorithm) placed and assessed at a new location (which may be only 10 m or less away from the previous location). This method may lead to a large number of closely-spaced locations all meeting the required criteria for the placement of a small cell and so the method may effectively recommend placement of many small cells in a very small geographic area. Since this would not make sense in most cases, the method may be configured to recommend placement of one small cell at the best or most practical or cost-effective of those closely-spaced locations, as this would suffice to solve the initial network problem.

In this scenario, a restriction may be placed on the placement of small cells to no less than a particular minimum spacing from one another (say 400 m, based upon a 200 m coverage for an outdoor small cell). This may help to prevent spurious recommendations of small cell placements from being generated and recommended, as discussed above.

It should be appreciated that incremental small cell deployment simulation/recommendation may also be provided. For instance, once an optimum (='best') location for a small cell, in a given area, has been determined/recommended, this result may be built into the simulation model when assessing remaining potential/candidate small cell locations. In other words, the simulation model may assume that this "optimum" small cell has already been deployed (even though it has not) and subsequent simulations may then be conducted on the assumption that a small cell is now present at this location. Re-assessing the nearby locations, with this "optimum" small cell in place (for the purposes of the simulation), may alter the landscape of the other potential/candidate locations. For example, these locations may now appear unattractive and the method may no longer recommend further small cell placements, in close proximity to it. In some embodiments, depending on the constraints/parameters placed on the method, this may not be the case. In some situations, there may be economic benefits to placing more than one small cell at the same or a similar location, for example, in situations where such a large congestion problem exists that a single small cell is not sufficient.

In some embodiments, it may be useful to implement the method for specifying the required small cell performance (or for selecting from a list of candidate small cell units/capabilities), for example in terms of the number of simultaneous users which the small cell BTS can support. In this way the method may not only propose where a small cell would be most beneficial, but may help determine and analyze what model or type of small cell (or what capability of small cell) may be required to meet the assessed peak capacity requirement at one or more locations.

At block, 330, the method 300 may end.

Figure 4:
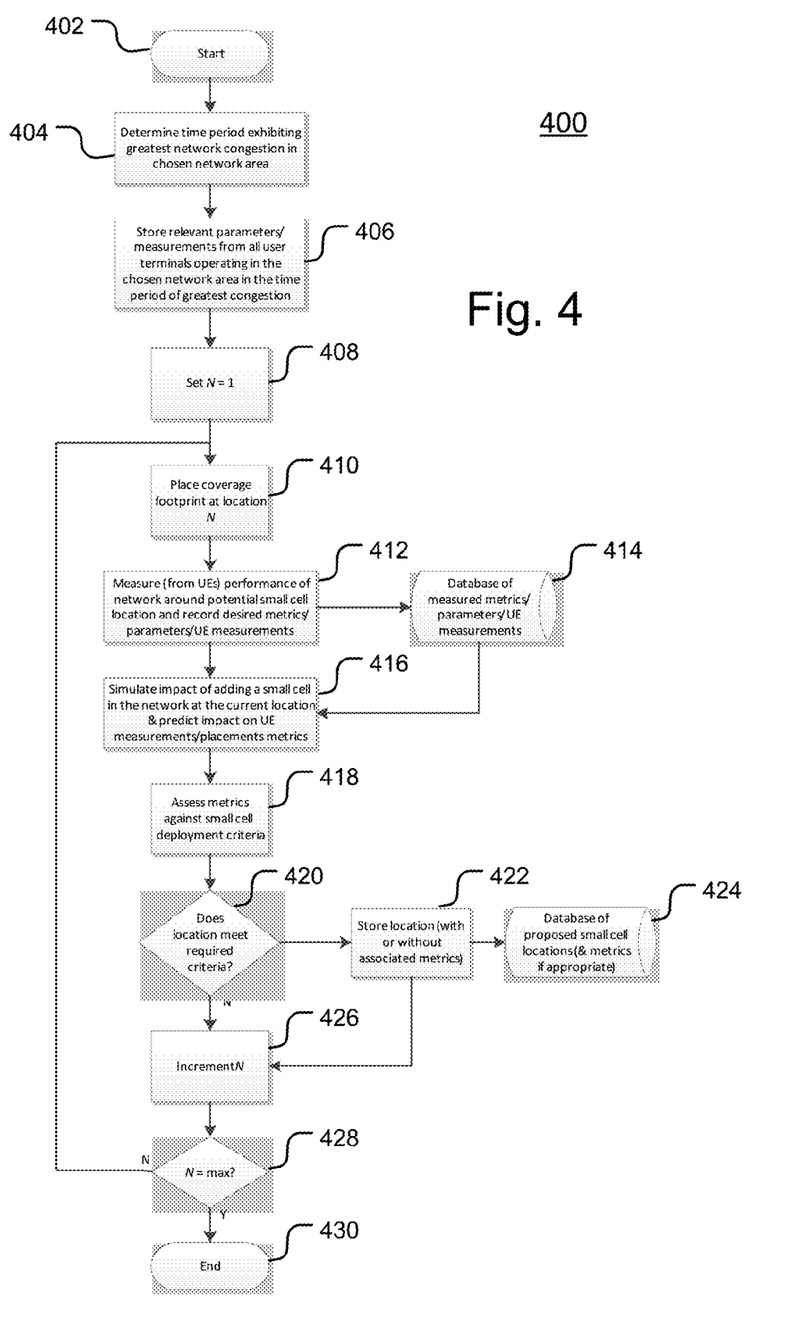
FIG. 4 depicts a flowchart of a method for planning small cell deployment, according to another exemplary embodiment.

FIG. 4 depicts a flowchart of a method for small cell deployment, according to another exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least the systems, configurations, diagrams, schematics, and modules in FIGS. 1-2, by way of example, and various elements of module 200 are referenced in explaining the exemplary method of FIG. 4. Each block shown in FIG. 4 represents one or more processes, methods, or subroutines carried out in the exemplary method 400. A non-transitory computer-readable medium comprising code, which when performed by a computer may perform the acts of the method 400 may also be provided. Referring to FIG. 4, the exemplary method 400 may begin at block 402.

In this scenario, the method may be used to help determine all potential small cell deployment locations, rather than just one or a few. Blocks 404-416 are similar to blocks 304-316 of FIG. 3. However, after simulation, at block 416, the method 400 may further analyze only those sites that meet the criteria for deployment of a small cell (block 418) which are stored in the database (the location is stored, with or without the associated metrics) (blocks 422 and 424). Metrics and/or locations for sites that fail to meet the required deployment criteria (block 420) may be discarded or are unused in this method 400. Blocks 422-428 are similar to blocks 322-328 of FIG. 3.

At block, 430, the method 400 may end. In some embodiments, indoor and outdoor network traffic may be considered in small cell deployment planning. For example, this method may be based on a variety of additional factors, such as velocity at which the user is travelling or other relevant metrics. It should be appreciated that the method may perform techniques associated with such factors in accordance with U.S. patent application Ser. No. 14/141,871 to Kenington et al., entitled "Method and Apparatus for Deriving Indoor/Outdoor Classification Information," filed on Dec. 27, 2013, which is hereby incorporated by reference in its entirety.

It should be appreciated that once traffic has been divided into indoor and outdoor categories, additional results may be provided. For example, in some embodiments, the metrics may be used to judge how placing a small cell at a given position may differ for indoor and outdoor locations, or the relative weighting of the criteria may be different, when forming and overall KPI score. For example, weighing a mobility metric may be different between these two categories since mobility will likely be lower for the indoor environments.

In some embodiments, it may be more efficient to run the method entirely separately for indoor cases versus outdoor cases. This may help avoid a situation where a high density of users, in a specific area, is concentrated within a single building. If this building is a skyscraper with many floors, then a single small cell may be unlikely to alleviate the congestion suffered by the macro network, since a single small cell will not provide coverage over very many of the floors.

It should be appreciated that the techniques described herein may help plan small cell deployment.

It should be appreciated that small cells, as described herein, may include radio transceivers that define a cell and may coordinate radio-link protocols with mobile devices. A small cell may also provide a networking component of a mobile communications system from which signals are sent and received. A small cell may be controlled and monitored by one or more Base Station Controllers (BSC) to provide communication over a network. The network may be the Internet or one or more other networks utilized for connecting various network providers and/or clients and allow for mobile communications between various mobile communications devices. As described above, a small cell may comprise configuration parameters that control various aspects of a cell site, where each of these parameters may be altered to change network behavior, based on observations of both the base station itself, measurements at the mobile station or handset, or other acquired or generated data. In addition, while embodiments described herein may have focused on small cell deployment, it should be appreciated that techniques described herein may also be applied to planning and deployment of other forms of base station, distributed antenna systems (DAS), macro cells, micro cells, pico cells, or other device that uses distributed radio technology to provide or enhance network coverage area. For example, a small cell as used herein may also include a hotspot, a relay, a repeater, or any system that uses a radio communication technology that is may be the same or different from the radio communication technology or radio communication technology used by the existing mobile communications network.

Mobile devices, as described herein, may include a variety of communications systems and/or devices. For example, such systems and/or devices may include desktop computers, laptops/notebooks, tablets, personal digital assistants (PDA), smart phones, wireline phones, cellular phones, mobile phones, satellite phones, MP3 players, video players, personal media players, personal video recorders (PVR), watches, gaming consoles/devices, navigation devices, televisions, printers, fitness devices, medical devices, and/or other devices capable of receiving and/or transmitting signals. It should be appreciated that a mobile device may be used independently or may be used as an integrated component in another device and/or system (e.g., an automobile). It should be appreciated that a mobile device may be mobile in the sense that radio frequency transmissions for connectivity may be used. For example, these may include smart meters, networked appliances, and/or larger computing devices as well.

It should be appreciated that a small cell, as described herein, may be connected to a variety of other backend systems. In order for the systems, configurations, and modules, as described herein, to provide various services to its subscribers, a small cell may be communicatively coupled to a base station, which in turn may be communicatively coupled to one or more servers, via the BSC or equivalent, which in turn may access a variety of databases. These databases may store a variety of information. For example, the databases may store information that identifies subscribers using its service and for which service features are subscribed. The databases may store information, such as a subscriber's customer name, identification number, services, or other identifiers, and/or whether a user's mobile devices are switched on or off. It should be appreciated that these databases may be highly robust and may further store geolocation information, geolocation-derived information, and other information suitable for planning small cell deployment.

It should be appreciated that the contents of these databases may be combined into fewer or greater numbers of databases and may be stored on one or more data storage systems and in more than one formats. The data storage systems may be local, remote, or a combination thereof to clients systems, servers, and/or other network components. Information stored in the databases may be useful in, for example, planning small cell deployment, providing simulation for small cell placement, make various small cell placement recommendations, and/or other related services.

Communication between the various base stations, mobile devices, service providers and/or subscribers may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Universal Mobile Telecommunications Systems (UMTS), Transmission Control Protocol/Internet (TCP/IP) Protocols, Long Term Evolution (LTE). Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, 802.11n, 802.11ac, etc., or via protocols for a wired connection, such as an IEEE Ethernet 802.3.

By providing a small cell deployment plan using at least the techniques described herein, a more reliable and efficient way to improve network capacity and balance economic considerations may be provided.

While the features and functionalities for planning small cell deployment are primarily discussed with respect to the embodiments above, it should be appreciated that the features and functionalities of one embodiment may be similarly applied to other embodiments. Furthermore, although the embodiments described above do not require use of GPS technology or other location services, it may be readily appreciated that the features and functionalities described herein may be used in conjunction with such technologies as well.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that providing a small cell deployment plan in accordance with the present disclosure as described above typically involves the processing of input data and the generation of output data to some extent. This input data processing and output data generation may be implemented in hardware or software. For example, specific electronic components may be employed in planning small cell deployment, simulating small cell placement, and providing small cell placement recommendations, in accordance with embodiments described above. Alternatively, one or more processors operating in accordance with instructions may implement the functions associated with providing a small cell deployment plan in accordance with embodiments as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

The invention claimed is:

1. A method, comprising:
   determining a time period in which network congestion is experienced within a mobile communications network;
   receiving measurement data from mobile communications devices of users within the mobile communications network for the time period;
   assessing performance of the mobile communications network during the time period based upon the measurement data;
   performing simulation analysis to determine an impact, on the performance of the mobile communications network during the time period, of placing an additional base station at each of a plurality of locations,
      for each respective location of the plurality of locations, the simulation analysis simulating the performance of the mobile communication network based on at least one of user mobility information at the respective location during the time period, uniqueness of users information at the respective location during the time period, status of users information at the respective location during the time period, radio resource control (RRC) connection set-up success rate information at the respective location during the time period, a quantity of dropped calls at the respective location during the time period, or a quantity of blocked calls at the respective location during the time period; and
   providing a recommendation for deployment of one or more base stations at a location of the plurality of locations based on the simulation analysis.

2. The method of claim 1, wherein the time period in which network congestion is experienced is within a particular portion of the mobile communications network.

3. The method of claim 1, wherein the measurement data comprises real user data that indicates quality of service at the time period.

4. The method of claim 1, wherein the measurement data is stored in one or more data storage systems.

5. The method of claim 1, wherein assessing the performance of the mobile communications network based upon the measurement data comprises:
   establishing a counter that represents all possible locations, where N represents a maximum of possible locations; and
   assessing the performance of the mobile communications network in an incremented fashion from location 1 to location N.

6. The method of claim 1, further comprising:
   determining the impact based on one or more key performance indicators (KPIs).

7. The method of claim 1, wherein the additional base station comprises at least one of a small cell, a hotspot, a distributed antenna system (DAS), a relay, a repeater, or a system that uses a radio communication technology that is different from the radio communication technology or radio communication technology used by the mobile communications network.

8. A system, comprising:
   one or more processors communicatively coupled to a mobile communications network, wherein the one or more processors are configured to:
      determine a time period in which network congestion is experienced within the mobile communications network;
      receive measurement data from mobile communications devices of users within the mobile communications network for the time period;
      assess performance of the mobile communications network during the time period based upon the measurement data;
      perform simulation analysis to determine an impact, on the performance of the mobile communications network during the time period, of placing an additional base station at each of a plurality of locations,
         for each respective location of the plurality of locations, the simulation analysis simulating the performance of the mobile communication network based on at least one of user mobility information at the respective location during the time period, uniqueness of users information at the respective location during the time period, status of users information at the respective location during the time period, radio resource control (RRC) connection set-up success rate information at the respective location during the time period, a quantity of dropped calls at the respective location during the time period, or a quantity of blocked calls at the respective location during the time period; and
      provide a recommendation for deployment of one or more base stations at a location of the plurality of locations based on the simulation analysis.

9. The system of claim 8, wherein the time period in which network congestion is experienced is within a particular portion of the mobile communications network.

10. The system of claim 8, wherein the measurement data comprises real user data that indicates quality of service at the time period.

11. The system of claim 8, wherein the measurement data is stored in one or more data storage systems.

12. The system of claim 8, wherein assessing the performance of the mobile communications network based upon the measurement data comprises:
   establishing a counter that represents all possible locations, where N represents a maximum of possible locations; and
   assessing the performance of the mobile communications network in an incremented fashion from location 1 to location N.

13. The system of claim 8, further comprising:
   assessing the impact on performance of the mobile communications network based on one or more improvement metrics.

14. The system of claim 8, wherein the recommendation for base station deployment is based on assessing the performance of the mobile communications network and performing the simulation analysis to determine the impact of placing the additional base station for all designated locations with the mobile communications network.

15. A non-transitory computer-readable medium storing instructions, the instructions comprising:
   one or more instructions that, when executed by one or more processors, cause the one or more processors to:
      determine a time period in which network congestion is experienced within a mobile communications network;
      receive measurement data from mobile communications devices of users within the mobile communications network for the time period;
      assess performance of the mobile communications network during the time period based upon the measurement data;

perform simulation analysis to determine an impact, on the performance of the mobile communications network during the time period, of placing an additional base station at each of a plurality of locations,
for each respective location of the plurality of locations, the simulation analysis simulating the performance of the mobile communication network based on at least one of user mobility information at the respective location during the time period, uniqueness of users information at the respective location during the time period, status of users information at the respective location during the time period, radio resource control (RRC) connection set-up success rate information at the respective location during the time period, a quantity of dropped calls at the respective location during the time period, or a quantity of blocked calls at the respective location during the time period; and
provide a recommendation for deployment of one or more base stations at a location of the plurality of locations based on the simulation analysis.

16. The non-transitory computer-readable medium of claim 15, wherein the user mobility information is associated with speed information.

17. The non-transitory computer-readable medium of claim 15, wherein the simulation analysis simulates the performance of the mobile communication network based on the RRC connection set-up success rate at the respective location during the time period.

18. The non-transitory computer-readable medium of claim 15, wherein the simulation analysis simulates the performance of the mobile communication network based on the dropped calls at the respective location during the time period.

19. The non-transitory computer-readable medium of claim 15, wherein the time period in which network congestion is experienced is within a particular portion of the mobile communications network.

20. The non-transitory computer-readable medium of claim 15, wherein the measurement data comprises real user data that indicates quality of service at the time period.

21. The non-transitory computer-readable medium of claim 15, wherein the measurement data is stored in one or more data storage systems.

* * * * *